United States Patent [19]

Takanashi

[11] Patent Number: 4,577,236
[45] Date of Patent: Mar. 18, 1986

[54] APPARATUS FOR REPRODUCING A COLOR VIDEO SIGNAL

[75] Inventor: Kenji Takanashi, Kanagawa, Japan

[73] Assignee: Sony Corporation, Tokyo, Japan

[21] Appl. No.: 508,190

[22] Filed: Jun. 27, 1983

[30] Foreign Application Priority Data

Jun. 29, 1982 [JP] Japan .................................. 57-111884

[51] Int. Cl.⁴ .......................................... H04N 5/782
[52] U.S. Cl. .................................... 358/320; 358/337; 358/339; 360/36.2
[58] Field of Search ............... 358/310, 320, 330, 335, 358/337, 339; 360/36.1, 36.2

[56] References Cited

U.S. PATENT DOCUMENTS

| | | | |
|---|---|---|---|
| 3,943,558 | 3/1976 | Izura et al. ........................ | 358/312 X |
| 4,090,214 | 5/1978 | Wright .............................. | 358/313 |
| 4,287,529 | 9/1981 | Tatami et al. ..................... | 358/320 |

Primary Examiner—Robert L. Richardson
Attorney, Agent, or Firm—Lewis H. Eslinger; Alvin Sinderbrand

[57] ABSTRACT

In a magnetic reproducing apparatus for reproducing a luminance signal and timebase-compressed chrominance component signals recorded on separate tracks of a record medium, the reproduced chrominance component signals are directly supplied to a timebase expander and this timebase expander uses a reference clock which reference clock is employed in the timebase correction of the luminance signal and frequency-divided by the timebase compression ratio whereby to perform the timebase expansion and the timebase correction at the same time. Thus, it is not necessary that the timebase correction and the timebase expansion are performed by separate circuits and this leads to a simple circuit arrangement.

15 Claims, 19 Drawing Figures

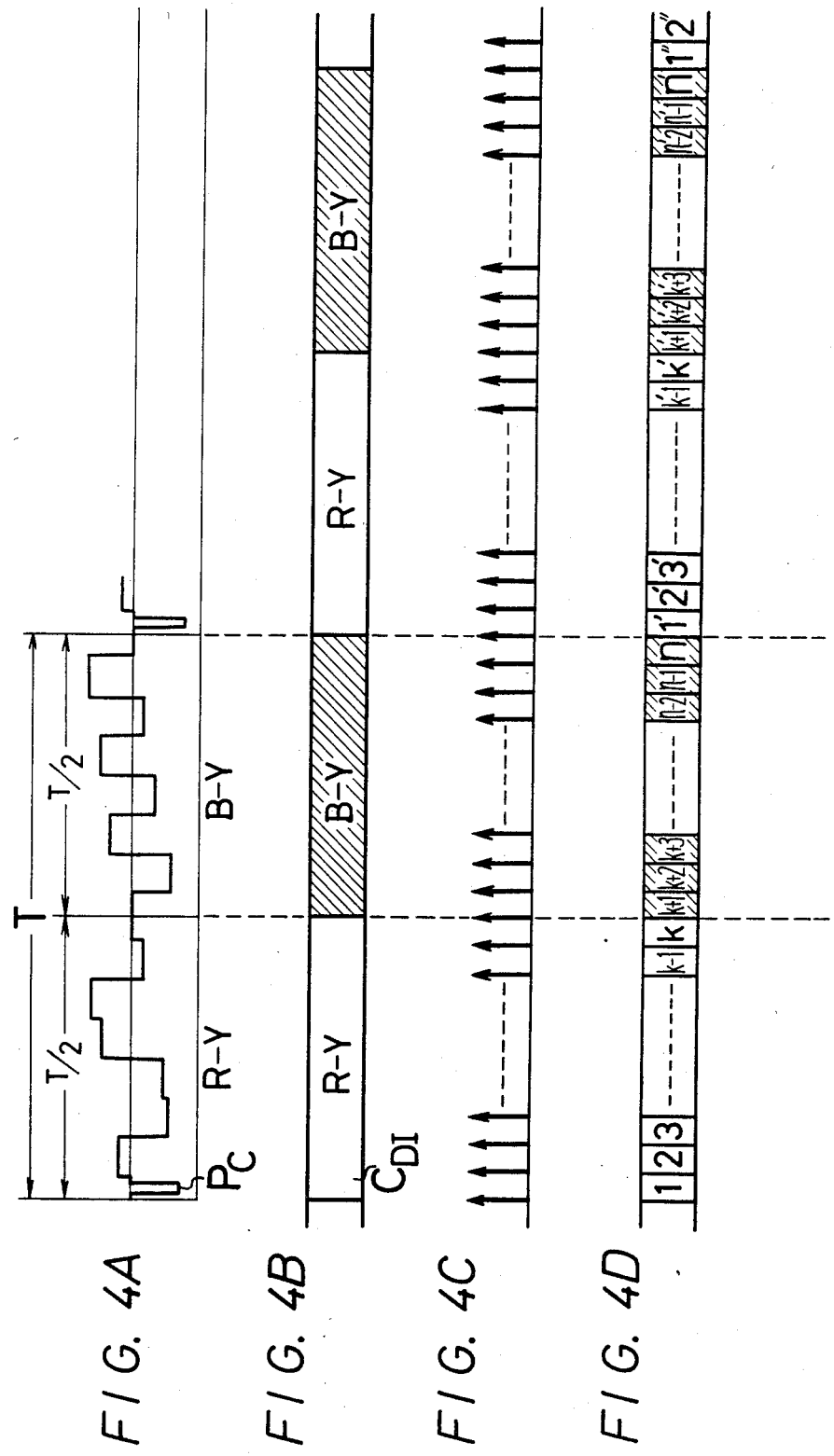

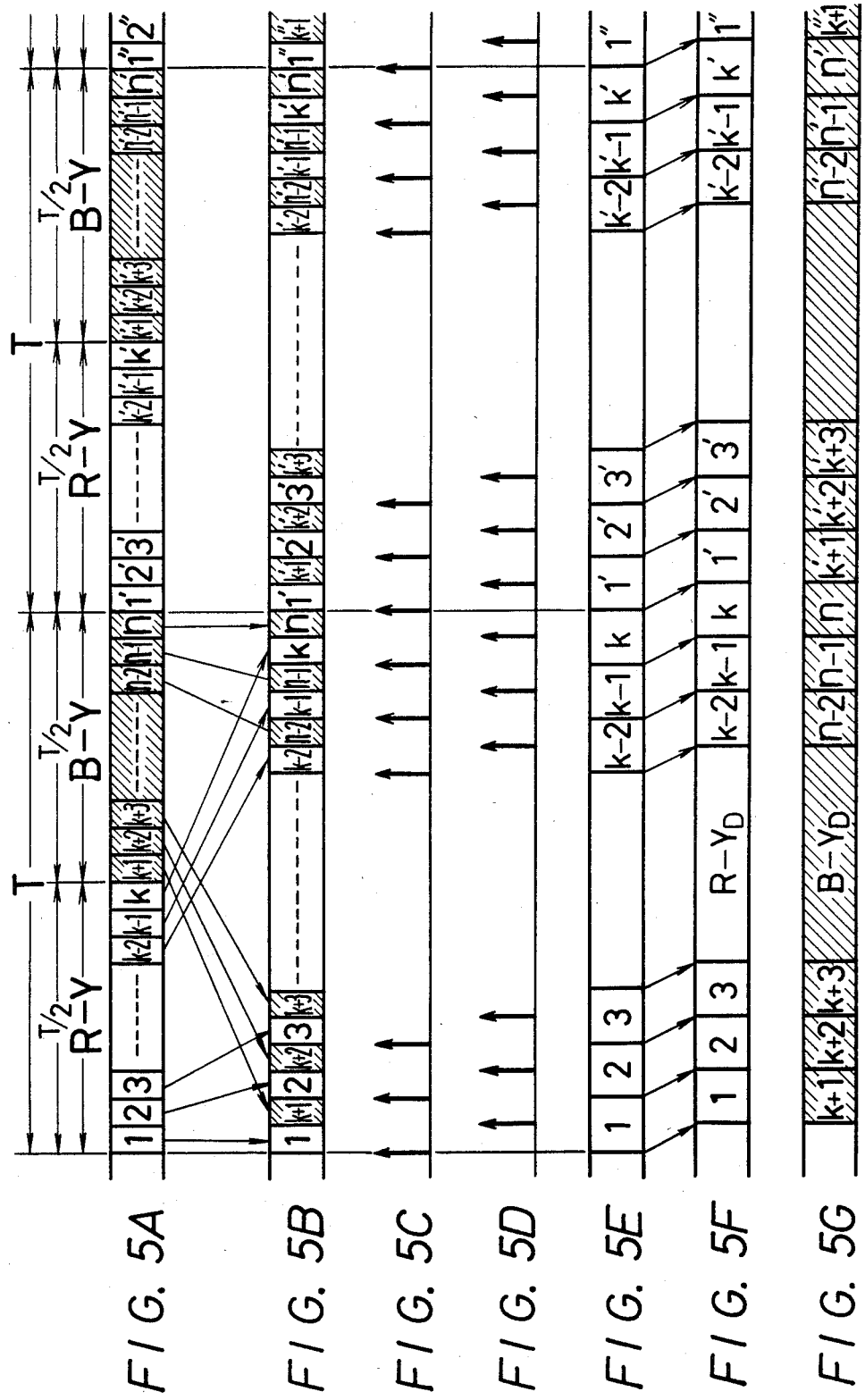

APPARATUS FOR REPRODUCING A COLOR VIDEO SIGNAL

BACKGROUND OF THE INVENTION

1. Field of the Invention

This invention generally relates to apparatus for reproducing a color video signal and in particular is directed to such a reproducing apparatus in which chrominance component signals are time-compressed and sequentially recorded on a track separate from a luminance component track.

2. Description of the Prior Art

When recording a video signal on a record medium, such a system is already known that a luminance signal and chrominance component signals are recorded on separate channels or tracks. According to an example of such recording system, a luminance signal is recorded on a first channel, while chrominance component signals such as I and Q signals or color difference signals (R-Y) and (B-Y) are time-compressed and recorded on a second channel. For example, the color difference signals (R-Y) and (B-Y) are respectively time-compressed to the half and recorded on the second channel in such a manner that the color difference signal (R-Y) is inserted into the first or former half of one horizontal period and the color difference signal (B-Y) is inserted into the second or latter half thereof. Upon reproducing the signals thus recorded, the luminance signal reproduced from the first channel is time-corrected in a timebase correcting circuit, while the time-compressed chrominance component signals reproduced from the second channel are time-corrected by the timebase correcting circuit and are further time-expanded by a timebase expanding circuit, thus the luminance signal and the chrominance component signals being reproduced. The conventional reproducing apparatus needs separate circuits for performing the timebase correction and the timebase expansion so that the circuit arrangement thereof becomes complex and large, which then pauses a problem in making the apparatus in small-size.

OBJECTS AND SUMMARY OF THE INVENTION

Accordingly, it is an object of this invention to provide an improved color video signal reproducing apparatus which overcomes the above-described disadvantages.

It is another object of this invention to provide such a reproducing apparatus for simultaneously performing a timebase-error correction and a time-expansion of a time-compressed video signal.

In accordance with an aspect of this invention, chrominance component signals such as color difference signals (R-Y) and (B-Y) are time-compressed and serially recorded in one horizontal duration on a different track from a luminance component track. Upon reproduction, the time-compressed chrominance component signals are written into a memory by a write clock which is locked with the synchronizing pulse of the chrominance component signals and read out from the memory by the reference read clock having a frequency corresponding to the compression ratio of the write clock frequency and thereby the chrominance component signals are time-expanded and the timebase-error is suppressed from the expanded chrominance component signals.

In accordance with another aspect of this invention, the reproduced luminance signal is written into another memory by a second write clock which is locked with the synchronizing pulse of the luminance signal and read out from another memory by the same reference read clock as used in read-out of the chrominance component signals, and thereby the luminance signal and the chrominance component signals are synchronously read out from the respective memories.

The other objects, features and advantages of the present invention will become apparent from the following description taken in conjunction with the accompanying drawings through which the like references designate the same elements and parts.

BRIEF DESCRIPTION OF THE DRAWINGS

FIGS. 4A to 4D are respectively signal write-in timing charts into a memory in the reproducing apparatus shown in FIG. 3;

FIGS. 5A to 5G are respectively signal read-out timing charts from the memory in the reproducing apparatus shown in FIG. 3; and FIGS. 6A to 6C are respectively timing charts of clocks used to read out signals from the memory in the reproducing apparatus shown in FIG. 3.

DESCRIPTION OF THE PREFERRED EMBODIMENT

Figure 1:
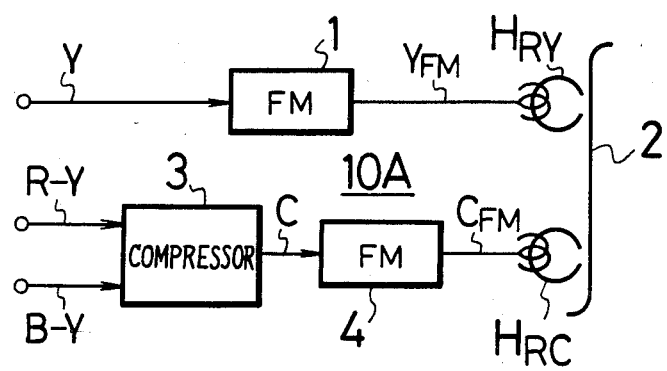
FIG. 1 is a systematic block diagram showing a recording apparatus used in this invention.

FIG. 1 is a block diagram showing an embodiment of a magnetic recording apparatus taking such a recording system in which a luminance signal and component chrominance signals are recorded on separate channels. Reference numeral 10A generally denotes a recording system thereof by which a luminance signal Y and chrominance component signals (for example, color difference signals (R-Y) and (B-Y), I and Q signals and so on), namely, color difference signals (R-Y) and (B-Y) in this embodiment, are recorded.

The luminance signal Y is FM-modulated by an FM-modulator 1, which is provided for angular modulation in this embodiment, to be an FM luminance signal $Y_{FM}$. The FM luminance signal $Y_{FM}$ is recorded on a magnetic tape 2 by a record head $H_{RY}$ to form a first track.

The color difference signals (R-Y) and (B-Y) are supplied to a timebase compressor 3 and the timebases thereof are each compressed to the half and then alternately arranged in one horizontal period in the order of the signals (R-Y) and (B-Y). That is, the signal (R-Y) was inserted into the former or first half of one horizontal period and the signal (B-Y) in the latter or second half thereof as a compressed color difference signal C. Thereafter, the signal C is FM-modulated by an FM modulator 4 so as to be FM color signal $C_{FM}$. This FM color signal $C_{FM}$ is recorded on a second track adjacent to the first track on the magnetic tape 2 by a record head $H_{RC}$.

Figure 2:
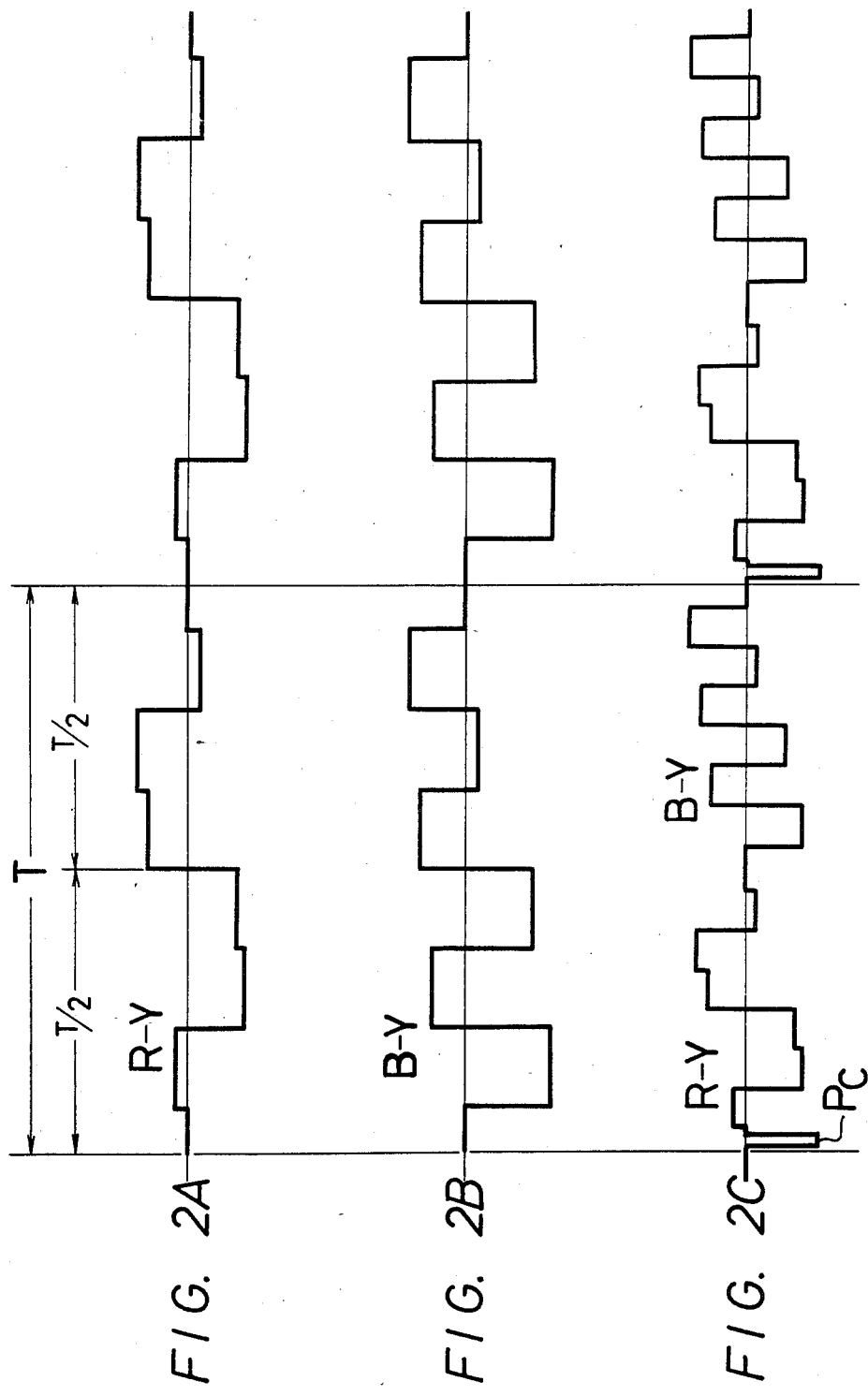
FIGS. 2A to 2C are respectively waveform diagrams showing color difference signals (R-Y) and (B-Y) and compressed color difference signals, each of which is recorded by the recording apparatus shown in FIG. 1.

FIGS. 2A and 2B each show examples of the waveforms of the color difference signals (R-Y) and (B-Y). If the color difference signals (R-Y) and (B-Y) are respectively compressed in timebase to the half and they are sequentially selected one to the other, the compressed color difference signal C shown in FIG. 2C is provided. This compressed color difference signal C is FM-modulated and is then recorded on the second track. It is herein noted that a synchronizing pulse $P_C$ which is equivalent to a horizontal synchronizing pulse $P_Y$ of the luminance signal is inserted in the compressed chrominance component signals in time with the pulse $P_Y$, as shown in FIG. 2C.

Figure 3:
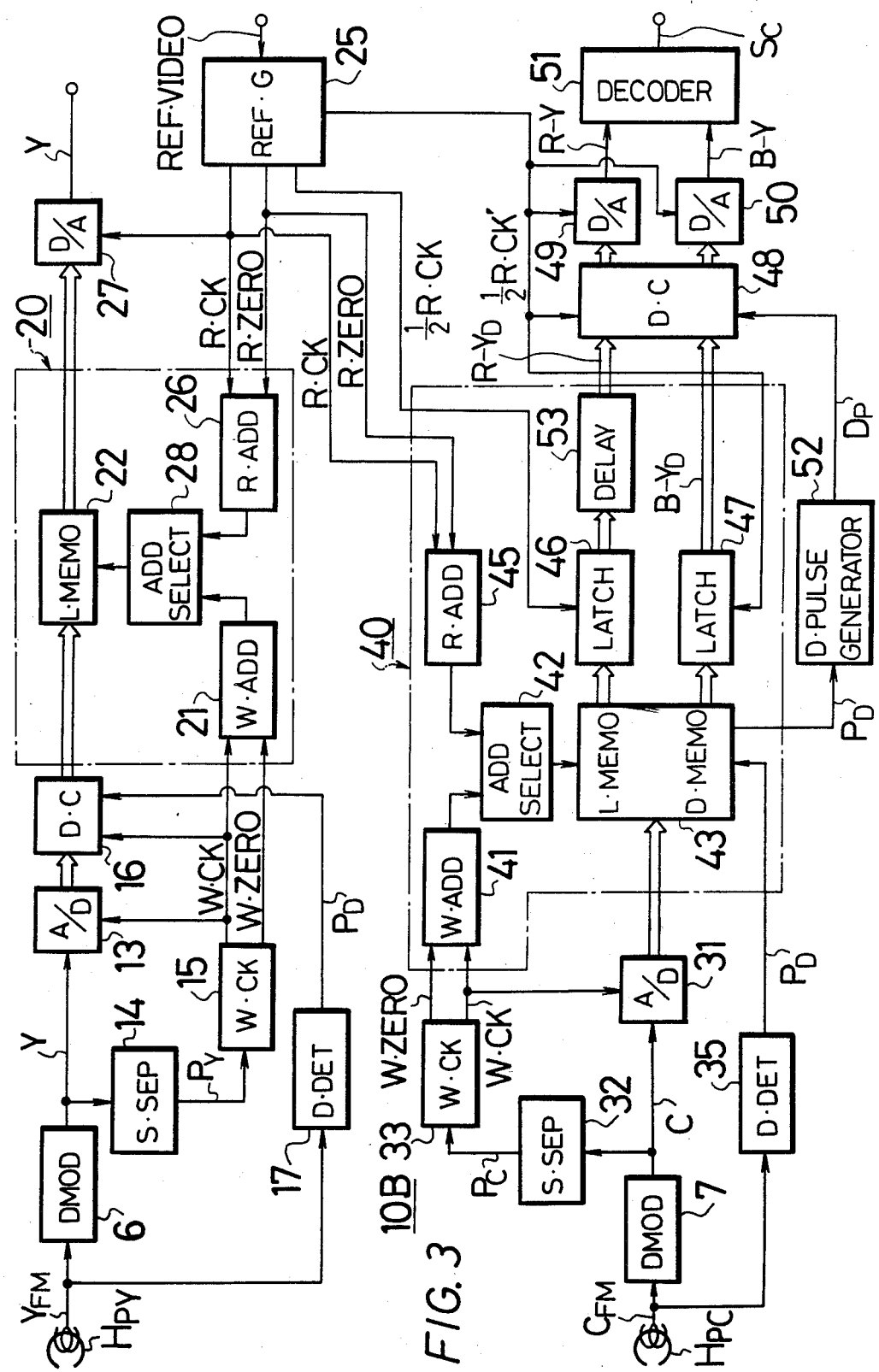
FIG. 3 is a block diagram showing an example of a reproducing apparatus according to this invention.

FIG. 3 is a block diagram showing an embodiment of a reproducing system 10B which is the subject matter of this invention.

As shown in FIG. 3, the reproduced FM luminance signal $Y_{FM}$ by a playback head $H_{PY}$ is demodulated by a demodulating circuit 6 and the demodulated luminance signal Y therefrom is converted to a digital signal by an A/D (analog-to-digital) converter 13. To this end, the demodulated luminance signal Y is supplied to a synchronizing separating circuit 14 in which a synchronizing pulse $P_Y$ inserted into the luminance signal Y at every horizontal periods (a horizontal synchronizing pulse or an equivalent pulse taken as a reference of the timebase) is separated from the demodulated luminance signal Y. On the basis of this synchronizing pulse $P_Y$, a generator 15 for generating a write clock W·CK is operated to generate write clock W·CK having the jitter same as that of the synchronizing pulse $P_Y$ and a write-in zero pulse W·ZERO.

The write clock W·CK is supplied to the A/D converter 13 and a dropout compensating circuit 16 at the rear stage of the A/D converter 13. The dropout compensating circuit 16 is provided to compensate for a dropout on the basis of a detection pulse $P_D$ generated from a dropout detecting circuit 17 which is supplied with the reproduced FM luminance signal $Y_{FM}$ by the playback head $H_{PY}$ and the write clock W·CK.

The write clock W·CK and the write zero pulse W·ZERO are further supplied to a write address counter 21 which is one of the components forming a TBC (timebase corrector) 20 so that a digital luminance signal from the dropout compensating circuit 16 is written in a line-memory 22 on the basis of the write address signal derived from the write address counter 21. It is noted that the line-memory 22 may be formed of a static RAM (random access memory) which is enough to have the capacity of at least two lines.

On the other hand, a reference clock generator 25 is synchronously operated by a video signal having a reference timebase without any jitter to generate a read clock (the same frequency as that of the write clock W·CK) R·CK and a read-out zero pulse R·ZERO by which a read-out address counter 26 is operated to generate a read-out address signal. In consequence, the digital luminance signal is read out from the line-memory 22 by the address signals the timebase of each of which is adjusted. Thus, the read-out digital luminance signal from the line-memory 22 is the data having no jitter, namely, the data the timebase of which is corrected to be the reference timebase is derived from the line-memory 22. This digital luminance signal is converted into an analog signal by a D/A (digital-to-analog) converter 27. Reference numeral 28 denotes an address selector which selects either of the write and read address signals from the counters 21 and 26 and supplies the selected one to the line-memory 22.

Next, the processing of the compressed chrominance component signals in the reproducing side will be explained with reference to FIGS. 4A to 4D and FIGS. 5A to 5G. As shown in FIG. 3, a compressed component FM color difference signal $C_{FM}$ reproduced by a reproduce head $H_{PC}$ is demodulated by a demodulating circuit 7. The compressed component color difference or chrominance signal C demodulated therefrom is converted to a digital signal by an A/D converter 31. The compressed chrominance component signal C is further supplied to a synchronizing separating circuit 32, in which a synchronizing signal $P_C$ inserted into the compressed chrominance component signal C at each horizontal synchronizing period is separated. As is described before, this synchronizing signal $P_C$ is assumed to be inserted into the compressed chrominance component signal C at the same position in time as that of the synchronizing signal $P_Y$ in the luminance signal Y. A write clock generator 33 is operated by the synchronizing signal $P_C$ to generate a write clock W·CK having the same jitter as that of the synchronizing signal $P_C$ and a write zero pulse W·ZERO. The write clock W·CK is supplied to the A/D converter 31, in which the compressed chrominance component signals are A/D-converted in response to the write clock W·CK. The digitized chrominance component signals from the A/D converter 31 are supplied to a memory circuit 40 which functions as a time-base-error corrector and a time-expander for the chrominance component signals. The memory circuit 40 is provided with write and read address counters 41 and 45, an address selector 42, a memory 43 and latch circuits 46 and 47. The output (the address signal) from the write address counter 41, which is supplied with the write clock W·CK and the write zero pulse W·ZERO from the write clock generator 33, is supplied through the address selector 42 to the memory 43 to designate the write address thereof. The memory 43 includes a line-memory for storing a digitized compressed chrominance component signal and a memory for storing the data of the dropout derived from a dropout detecting circuit 35 which is supplied with the compressed chrominance signal from the head H The line-memory may be formed of a static RAM and enough to have the capacity of two lines.

FIG. 4A is a waveform diagram showing an example of a compressed chrominance component or color difference signal C equivalent to that in FIG. 2C wherein the compressed color difference signal (R-Y) is inserted into the first or former half of one horizontal synchronizing period T, while the compressed color difference signal (B-Y) is inserted into the second or latter half thereof. FIG. 4B is a waveform diagram schematically showing a signal $C_{DI}$ which results from A/D-converting the compressed color difference signal C by the A/D converter 31. FIG. 4C shows the write clock W·CK by which the digitized compressed color difference signal $C_{DI}$ is written in the memory 43. The write address counter 41 is operated by this write clock W·CK. Then, in response to the write address from the write address counter 41 shown in FIG. 4C, the digitized compressed color difference signal $C_{DI}$ as shown in FIG. 4B is written in the memory 43. Namely, the compressed color difference signal (R-Y) is written at the write addresses 1 to k and the compressed color difference signal (B-Y) at the write addresses k+1 to n. The data is read out from the memory 43 on the basis of the output from the read address counter 45. To this read address counter 45 are supplied the same read clock R·CK and read zero pulse R·ZERO as those in the luminance signal reproducing system from the reference clock generator 25. As is hereinbefore described, into the memory 43 are stored the data as shown in FIG. 5A. However, as shown in FIG. 5B, the read address counter 45 allows a read address to be supplied to the memory 43 from which the compressed color difference signals (R-Y) and (B-Y) are alternately read out as in 1, k+1, 2, k+2, ... k−1, n−1, k, n. The data read out from the memory 43 are supplied to the latch circuits 46 and 47 in the special way as hereinbelow described. That is, in the latch circuit 46, the latch operation is performed in response to a clock ½R·CK (refer to FIG. 6B) which results from frequency-dividing a read clock R·CK shown in FIG. 6A by 2 (in this embodiment, divided by the compression ratio). Thus, in the output from the latch circuit 46 sequentially appear addresses 1, 2, 3 ... k−2, k−1, k, 1', 2', 3' ... k'−2, k'−1, k' as shown in FIG. 5E. In other words, the latch circuit 46 derives data (R-Y$_D$) formed of only the color difference signals (R-Y) the timebase of which is expanded twice as large as the original one. On the other hand, in the latch circuit 47, the latch operation is performed in response to a clock ½R·CK' as shown in FIG. 6C, which clock ½R·CK' is shifted by W (a half cycle of the read clock R·CK) from the clock ½R·CK supplied to the latch circuit 46. Thus, in the output from the latch circuit 47 sequentially appear addresses k+1, k+2, ... n−1, n, k'+1, k'+2, ... n'−1, n' as shown in FIG. 5G. That is, the latch circuit 47 produces data (B-Y$_D$) consisting of only the color difference signals (B-Y) the timebase of which is expanded twice as large as the original one. In this case, since the data (R-Y$_D$) and (B-Y$_D$) are displaced from each other by W on timebase, as shown in FIG. 5F, the data (R-Y$_D$) is delayed by a delay circuit 53 so as to match the timebases of the data (R-Y$_D$) and (B-Y$_D$). The data or signals (R-Y$_D$) and (B-Y$_D$) thus obtained are supplied to a dropout compensating circuit 48. A dropout data P$_D$ read out from the memory 43 is supplied to a dropout pulse generator 52. A dropout pulse D$_P$ derived from the dropout pulse generator 52 is supplied together with the ½-read clock ½R·CK' shown in FIG. 6C to the dropout compensating circuit 48 in which the dropout compensation for the signals (R-Y$_D$) and (B-Y$_D$) is performed as follows. When the dropout occurs in either the signal (R-Y$_D$) or the signal (B-Y$_D$), the dropout compensating circuit 48 is operated such that the portion of the signal (R-Y$_D$) or (B-Y$_D$) at which the dropout occurs as well as the portion of the signal (B-Y$_D$) or (R-Y$_D$) corresponding in time thereto are replaced by the previous data. Since the dropout compensating operation is performed as described above, even when the color difference signals (R-Y) and (B-Y) are converted to be a carrier chrominance signal thereafter, no unnatural color occurs. Further, the color difference signals (R-Y$_D$) and (B-Y$_D$) are respectively supplied to D/A converters 49 and 50, each of which is operated by the clock ½R·CK' and then converted to analog signals (R-Y) and (B-Y). The pair of the color difference signals (R-Y) and (B-Y) are then converted into a carrier chrominance signal Sc by a decoder 51. Since the read address signal the timebase of which is expanded twice, or having the frequency ½ times as high as the original one is formed on the basis of clocks derived from the reference clock generator 25 and the timebases of which are constant, namely, the read clocks R·CK and ½R·CK and the read zero pulse R·ZERO, the timebase of the data read out in response to these address signals is expanded twice as large as that upon writing and the period during which the data is read out is always made constant. That is, the data containing no jitter can be obtained.

Furthermore, when the luminance signal Y and the compressed chrominance component signal C, each of which is related to each other in time are recorded over two tracks, the transmission times of the respective channels are not exactly the same so that somewhat time difference occurs between both the signals Y and C after being reproduced, thus requiring a separate timebase correcting circuit therefor.

However, according to this invention, since the luminance signal Y-system and the compressed chrominance component signal C-system are simultaneously operated by the clocks derived from the reference clock generator 25, the data read out from the memories 22 and 43 have no time difference therebetween. Accordingly, even if there is a difference between the transmission times, such difference of the transmission times can be compensated for at the same time.

While in the above the pair of the color difference signals are used as the chrominance signals to be recorded, the I and Q signals and other chrominance component signals may be used.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. Apparatus for reproducing a color video signal from a recording medium on which a luminance component is recorded in a first channel and at least two chrominance components are recorded in a second channel such that the chrominance components are tire-compressed and successively recorded in cyclically repeated fashion, comprising:
    means for generating a first write clock in response to a first synchronizing signal contained in said luminance component;
    means for generating a second write clock in response to a second synchronizing signal contained in one of said chrominance components;
    first memory means for storing said luminance component reproduced from said first channel in synchronism with said first write clock;
    second memory means for storing said chrominance components reproduced from said second channel in synchronism with said second write clock;
    reference clock generator means for generating a reference clock supplied to said first and second memory means;
    means for reading out said luminance component from said first memory means in response to said reference clock; and
    means for reading out said chrominance components from said second memory means in accordance with said reference clock to thereby time-expand said chrominance components and simultaneously synchronize said chrominance components with said luminance component.

2. Apparatus according to claim 1, in which said second memory means includes a main memory for storing all of said chrominance components, and a plurality of latch means, each storing one of said chrominance components read out from said main memory, respectively.

3. Apparatus according to claim 2, in which said means for reading out said chrominance components includes means for generating a second reference clock having a frequency equal to the frequency of said first reference clock times the inverse of said compression ratio of said chrominance components, said first chrominance component being read out in accordance with said second reference clock.

4. Apparatus according to claim 3, wherein there are two chrominance components, said apparatus further including means for generating a third reference clock having the same frequency as and opposite phase of said second reference clock, said second chrominance component being read out in synchronism with said third reference clock.

5. Apparatus according to claim 4, in which said means for reading out said chrominance components further includes means for supplying said first reference clock to said main memory, means for supply said second reference clock to a first latch means, and means for supplying said third reference clock to a second latch means, such that said two chrominance components read out from said main memory are alternately stored in said first and second latch means, respectively, and said chrominance components read out from said first and second latch means in synchronism with said second and third reference clocks, respectively, are time expanded by the inverse of said compression ratio.

6. Apparatus according to claim 5, in which said means for reading out said chrominance components includes delay means which is connected with an output of a selected one of said first and second latch means to synchronize said two chrominance components.

7. Apparatus according to claim 5, in which said means for reading out said chrominance components includes drop-out compensating means connected to outputs of said first and second latch means for compensating both of said chrominance components when at least one of said chrominance components is dropped out.

8. Apparatus for reproducing a signal from a recording medium on which a first component of said signal is recorded in a first channel and at least second and third components are recorded in a second channel, said at least second and third components having been time-compressed by a predetermined compression ratio, said apparatus comprising:
    first timebase corrector means for timebase correcting said first component in accordance with a first reference clock; and
    second timebase corrector means for timebase correcting said at least second and third components in accordance with a second reference clock;
    said second reference clock having a frequency equal to the frequency of said first reference clock times the inverse of said compression ratio;
    whereby said second timebase corrector means timebase expands said at least second and third components to be in synchronism with said first component.

9. Apparatus according to claim 8, wherein said signal is a color video signal, said first component is a luminance component and said at least second and third components are chrominance components.

10. Apparatus according to claim 8, wherein said first component contains a first synchronizing signal and one of said at least second and third components contains a second synchronizing signal;
    said first timebase correcting means includes first memory means, means for writing said first component into said first memory means in accordance with said first synchronizing signal, and first means for reading out said stored first component from said first memory means in accordance with said first reference clock; and
    said second timebase correcting means includes second memory means, means for writing said at least second and third components into said second memory means in accordance with said second synchronizing signal, and second means for reading out said stored at least second and third components from said second memory means in accordance with said second reference clock.

11. Apparatus according to claim 10, wherein said second memory means includes a main memory and a plurality of latch means corresponding to said at least second and third components.

12. Apparatus according to claim 11, wherein said second time base corrector includes means for generating a plurality of third reference clocks having the same frequency as said second reference clock, but different phases;
    said at least second and third components being written into said main memory in accordance with said second synchronizing signal;
    said at least second and third components being read out from said main memory in accordance with said first reference clock and respectively supplied to a respective one of said latch means;
    said second component being latched in its respective latch means in accordance with said second reference clock and the remaining components latched in their respective latch means in accordance with a respective one of said third reference clocks, whereby each component is timebase expanded by the inverse of said compression ratio.

13. Apparatus according to claim 11, wherein said second timebase correcting means further includes drop-out compensation means connected to said plurality of latch means for compensating all of said at least second and third components when at least one thereof is dropped out.

14. Apparatus according to claim 11, wherein said second timebase correcting means further includes delay means connected to all except one of said latch means for synchronizing said at least second and third components.

15. Apparatus according to claim 12, wherein said input signal is a color video signal, said first component is a luminance component, said at least second and third components are first and second chrominance components, said compression ratio is 2 and said third reference clock has the opposite phase to said second reference clock.

* * * * *